United States Patent Office 3,649,611
Patented Mar. 14, 1972

3,649,611
SPLITTABLE POLYOLEFIN FILM
Munehiro Okumura, Tatsuaki Nishikawa, and Nobuaki Nishikawa, Otake-shi, Japan, assignors to Mitsubishi Rayon Company Limited, Tokyo, Japan
Filed May 23, 1968, Ser. No. 731,431
Claims priority, application Japan, May 24, 1967, 42/33,009, 42/33,010
Int. Cl. C08f 3/08, 47/22
U.S. Cl. 260—93.7          1 Claim

ABSTRACT OF THE DISCLOSURE

An improved splittable polyolefin film which is useful for producing bulk yarns is characterized by a characteristic temperature relating to visco-elasticity ranging from 138° C. to the melting point of the polyolefin, a ratio of the tensile strength of a 40 cm. length of the film and the tensile strength of 1 cm. length of the film ranging from 0.2 to 0.9 and a thickness ranging from 5 to 1,200μ. A polyolefin film having these characteristics is manufactured by drawing a polyolefin at a temperature of at least 175° C. in a first drawing operation and then drawing the polyolefin in a second drawing operation at a temperature of at least 175° C.

The splittability of the film is enhanced by the presence of additional polymers and by the addition of certain metallic salts of organic carboxylic acids.

Textile products made of the film have desirable strength, excellent dyeability and antistatic properties.

BACKGROUND OF THE INVENTION

This invention relates to an improved splittable polyolefin film for manufacturing bulk yarns directly from the same.

It has been known that yarn-like structures can be obtained by fibrillating highly oriented films. A typical method for producing bulk yarns from film strips is described in U.S. Pat. No. 3,177,557 and other methods for splitting films, such as brushing, rubbing, beating, crumpling, drawing films at a right angle to the longitudinal direction of the films, and cutting methods have been proposed or developed. However, it is necessary to select the material films in order to obtain split films having a configuration comprising bundles of fine fiber-like pieces and sufficient strength required for producing practical yarns.

However, conventional polypropylene films which can be purchased on the market are not suitable to use for splitting films into a bundle of fiber-like pieces.

SUMMARY OF THE INVENTION

It is an object of this invention to provide a polyolefin film particularly suitable for producing bulk yarns having the aesthetic qualities and covering power of staple spun yarns, and further having sufficient practical strength even without twist.

It is another object of this invention to provide an easily splittable polyolefin film for producing yarns for practical use in woven cloth or for industrial use.

It is a further object of this invention to provide an easily splittable polyolefin film for producing yarns for practical use in woven cloth or for industrial use.

It is a further object of this invention to provide an easily splittable polyolefin film having excellent dyeability and antistatic properties.

It has been found that the splittability of polyolefin films is related to the temperature ($T_c$) related to visco-elasticity wherein ($T_c$) is the temperature of the third or maximum peak of a curve obtained by plotting the value of said visco-elasticity against the temperature and to the length dependence of strength, $S_{40}/S_1$ of the film, wherein $S_{40}$ is the tensile strength of a 40 cm. length of said film and $S_1$ is the tensile strength of a 1 cm. length of said film. According to the present invention, it has been discovered that polyolefin films which are from 5 to 1200μ thick, which have a temperature ($T_c$) related to visco-elasticity in the range of 138° C. to the melting point of said film and which also have a length dependence of strength ($S_{40}/S_1$) value of 0.2 to 0.9 are highly splittable and suitable for producing fine fibers to be used as bulk yarns.

It has also been discovered, according to the present invention that a highly splittable polyolefin film which has these physical characteristics may be produced by drawing a polyolefin up at a drawing ratio of about 0.81 to 0.95 of the maximum draw ratio at a temperature of at least about 175° C. and subsequently drawing the polyolefin again at a drawing ratio from 1.1 to 1.3 while said polyolefin is heated to a temperature of at least about 175° C.

DESCRIPTION OF THE PREFERRED EMBODIMENTS

The terms hereinafter used in the specification are defined as follows:

"Polyolefin film" includes any type of film such as a tape, a sheet and the like materials which have a thin dimension and a shape similar to that of a film.

"Tan δ" is defined in the following equation:

$$\tan \delta = E_2/E_1$$

where:

$E_1$ is the elastic modulus of the film, and
$E_2$ is the loss modulus of the film, which may be measured by the "dynamic measuring method."

Figures 1A, 1B, 1C, 2:
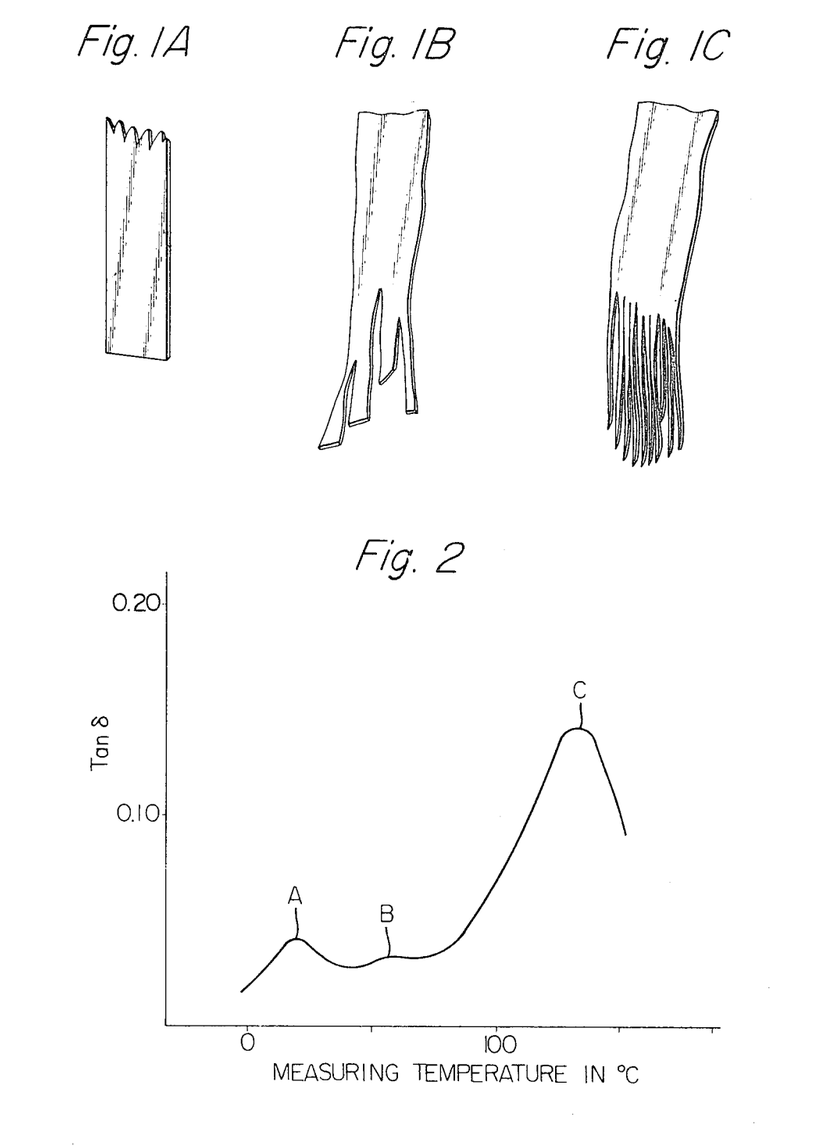
FIGS. 1A, 1B and 1C are longitudinal enlarged views of a film having a fibrillated end.
FIG. 2 is a diagram showing the relationship between the visco-elastic property tan δ of a polyolefin film and the measuring temperature in ° C.

It has been found useful to grade various types of polyolefin film with respect to its splitting ability; "the grade of split" of polyolefin film is determined as follows:

Referring to FIGS. 1A, 1B and 1C, a test specimen of a film of 1,000 d. is prepared and the tensile strength of the test specimen is tested with "Instron," a constant rate stretch tester, at an elongation speed of 200%/min., and the cut end of the specimen after breaking is observed. In this observation, the fineness of the split fibrous pieces is measured. For convenience the finenesses of the split fibrous pieces are divided into 7 grades which are defined in Table 1. Accordingly, Table 1 shows the correlation between the grade of splittability of a polyolefin film and the average fineness, i.e. denier of the resulting fibers. As is shown in Table 1, the grade of splittability of a polyolefin film increases with the increasing average fineness or with decreasing average denier of the split fibrous piece.

The view of the specimen shown in FIG. 1A illustrates the specimen before the tensile test, those shown in FIGS. 1B and 1C illustrate the broken ends of the specimen having a plurality of split fibrous pieces wherein the split fibrous pieces shown in FIG. 1C are more fibrous than those shown in FIG. 1B.

TABLE 1

| Grade | Average value of the measured fineness |
|---|---|
| 7 | From 3 d. to 10 d. |
| 6 | Above 10 d. to 30 d. |
| 5 | Above 30 d. to 50 d. |
| 4 | Above 50 d. to 80 d. |
| 3 | Above 80 d. to 200 d. |
| 2 | Above 200 d. to 500 d. |
| 1 | Above 500 d. to 1,000 d. |

Based on the above-described method for evaluating the splittability of the polyolefin film, the splittability of conventional polypropylene film available on the market is in the third grade; the fineness of the split fibrous pieces of the film is not sufficiently fine for producing textile yarns for practical use. It may be possible to split films into very fine fiber-like pieces by applying a very strong mechanical force, if the strength of the split fibrous pieces of the film can be ignored, however sufficient strength of the split fibrous pieces of the films is also a requirement for almost all practical uses of fibers. Consequently, the production of the textile yarns on a large scale by treating available polyolefins according to any of the splitting processes mentioned above is not possible.

Surprisingly, we have discovered that close correlations exist between certain physical properties and the grade of splittability of polyolefin film. These correlations have been discovered by preparing many specimens of polyolefin films having different physical properties, measuring the grade of the splittability of each specimen and studying the statistical relationships between the various physical properties and the grade of the splittability of the polyolefin films.

Table 2 shows test results of three specimens made from three different polyolefin films purchased on the common market and of ten specimens numbered 4–13 prepared as follows; specimens 6–13 were prepared according to the method of this invention and specimens 4 and 5 were prepared for comparison purposes. The method used in preparing specimens 4–13 is described in the following example.

EXAMPLE 1

Figure 4:
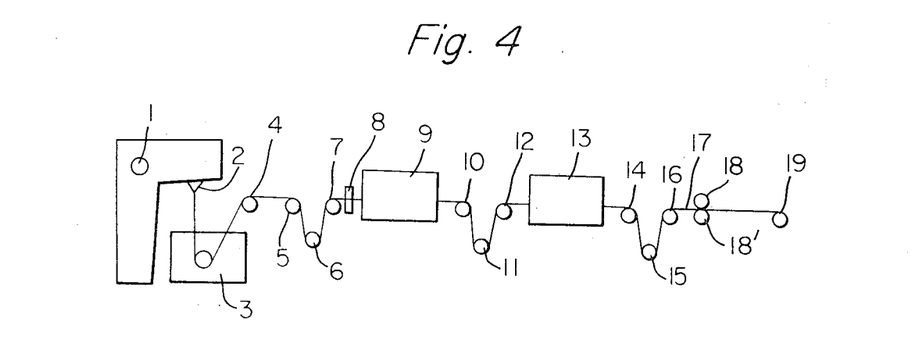
FIG. 4 is a schematic flow diagram of a process for manufacturing polypropylene film according to the present invention.

Referring to FIG. 4, polypropylene pellets to which as an antioxidant, a mixture of 0.005 part of dilauryl thiodipropionate and 0.3 part of 4,4′-thiobis-6-t-butyl-3-methylphenol per 100 parts of polypropylene has been added were melted at a maximum temperature of 270° C. and plasticized with a screw extruder 1 and the molten polypropylene was extruded from a T-dice 2. The extruded polypropylene was cooled in a cooling bath 3 and cut into a plurality of tapes having a predetermined width by means of a cutter 8 after passing through a guide roll 4, and rollers 5, 6 and 7. The tapes thus produced were drawn at a ratio of 0.81 to 0.95 of the maximum drawing ratio while passing through a heater box 9 heated by a conventional heating means such as infrared heater element or heated air or superheated steam. After the above-mentioned first drawing operation and passing through rollers 10, 11 and 12, the polypropylene tapes 17 were drawn at a drawing ratio from 1.1 to 1.3 in the succeeding heating box 13, and then taken up on a take-up roll 19 after passing through rollers 14, 15 and 16. The take-up roll 19 was supported by a pair of nip rollers 18 and 18′.

The intrinsic viscosity of the polypropylene pellet measured in a Tetralin solution at 135° C. was 2.5 and the isotacticity of the polypropylene pellet was 94%. The temperature in the first heating box 9 was maintained at above 175° C. by controlling the temperature of the heating element of the box 9 in a range from 320° C. to 370° C. The temperature in the second heating box 13 was set at several levels in order to obtain several polypropylene films having different characteristic features shown in Table 2.

It has been found that the temperature ($T_c$) related to tan $\delta$ and a ratio of $S_{40}/S_1$ are characteristic features of the polypropylene films prepared according to our invention. That is, it was discovered by statistical analysis that the correlation between the temperature related to and the splittability of the polypropylene film, as defined by the above-mentioned grades, and the correlation between the ratio of $S_{40}/S_1$ are statistically sufficiently significant, and that when a polyolefin is produced which has a particular ($T_c$) and a particular $S_{40}/S_1$, the film may be split into useful fibers.

The above mentioned term, tan $\delta$ defines the viscoelasticity and was measured in the following way. Specimens of films having a definite fineness of 1,000 d. were prepared. "Tan $\delta$" of a specimen 2 cm. in length was measured by using "An instrument for measuring viscoelasticity" under a frequency of 110 cycle/second and a temperature rise in the heating box of 1° C./min. An instrument made by a Japanese corporation, Toyo Sokki Co., was used. The diagram in FIG. 2 shows the variation of "tan $\delta$" in accordance with the measuring temperature. As it is clear in FIG. 2, the variation curve of tan $\delta$ includes one to three peaks. The magnitude of tan $\delta$ and the temperature, ($T_c$) of these peaks designated by A, B and C varied in accordance with the internal structure of the specimens which is usually related to the molecular orientation and crystallinity. In our study, it was also found that the temperature related to tan $\delta$ at the third peak C. which as shown in FIG. 2 is the maximum tan $\delta$ is used preferably as a characteristic of the present polyolefin film.

Figure 3:
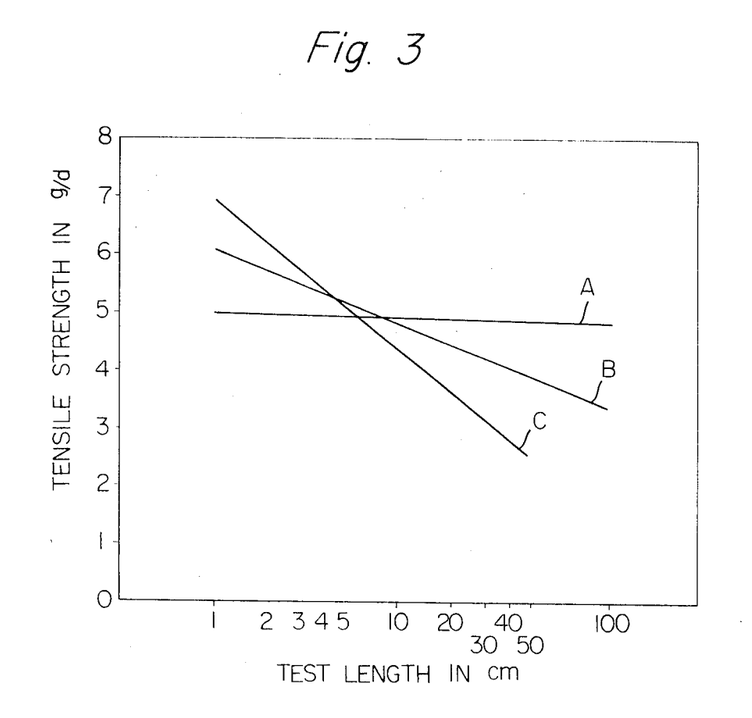
FIG. 3 is a diagram showing the relationship between the tensile strength in gram per denier of a polyolefin film having fineness of 1,000 denier and length of the film in cm.

Referring to FIG. 3, when the tensile strengths of these specimens are measured by using an "Instron" at a drawing speed of 50%/min., the tensile strength of the specimens varies in accordance with the test length of the specimen.

This phenomenon can be considered as the length dependence of strength, which depends upon the internal structure of the polyolefin film, such as molecular orientation, crystallinity and further upon the uniformity of the internal structure.

Consequently, the length dependence of strength for polyolefin films having different internal structure are different from each other, as shown by lines A, B, C, of FIG. 3. We have discovered that the parameter of $S_{40}/S_1$ is also a characteristic of the splittability of a polyolefin film wherein $S_{40}$ represents the tensile strength of the specimen having length of 40 cm. while $S_1$ represents the tensile strength of the specimen having test length of 1 cm.

TABLE 2

| Item | $T_1$ (° C.) | SR | $T_2$ (° C.) | DR | t | Tc | $S_{40}/S_1$ | $S_1$ (g./d.) | ST (g./d.) | Grade of splitability |
|---|---|---|---|---|---|---|---|---|---|---|
| 1 | | | | | | 131 | 0.98 | | | 1 |
| 2 | | | | | | 134 | 0.94 | | | 2 |
| 3 | | | | | | 130 | 0.97 | | | 1 |
| 4 | 130 | 0.7 | | | 30 | 130 | 0.85 | 4.9 | 5.1 | 3 |
| 5 | 160 | 0.7 | 140 | 1.2 | 35 | 139 | 0.95 | 5.1 | 5.4 | 2 |
| 6 | 180 | 0.95 | 180 | 1.3 | 15 | 142 | 0.6 | 6.1 | 6.9 | 7 |
| 7 | 180 | 0.85 | 180 | 1.2 | 30 | 149 | 0.8 | 5.9 | 6.4 | 6 |
| 8 | 180 | 0.9 | 180 | 1.1 | 120 | 148 | 0.7 | 5.6 | 6.2 | 7 |
| 9 | 190 | 0.95 | 190 | 1.1 | 900 | 159 | 0.4 | 5.7 | 6.0 | 7 |
| 10 | 175 | 0.85 | 180 | 1.1 | 60 | 140 | 0.8 | 5.1 | 5.9 | 5 |
| 11 | 175 | 0.85 | 180 | 1.1 | 300 | 145 | 0.8 | 5.2 | 5.8 | 4 |
| 12 | 175 | 0.85 | 175 | 1.1 | 15 | 139 | 0.9 | 5.1 | 5.8 | 5 |
| 13 | 175 | 0.85 | 175 | 1.1 | 7 | 150 | 0.8 | 5.1 | 5.7 | 5 |

NOTE.—
$T_1$(° C.)=drawing temperature of the first drawing process in ° C.
$SR = \dfrac{DR}{\text{maximum drawing ratio}}$
$T_2$(° C.)=drawing temperature of the second drawing process in ° C.
DR=drawing ratio.
t=thickness of the specimens, in $\mu$.
ST=tensile strength of twisted films.
Tc=Temperature ° C. of peak "C" of tan $\delta$.

Referring to Table 2, the correlation between the temperature related to the visco-elasticity and the splittability of the polyolefin film has been statistically analyzed as follows:

Table 3A shows the statistical analysis table of the splittability of polyolefin specimens with the temperature related to tan $\delta$ of the specimens shown in Table 2. In the table, the splittability of the specimens is classified into two groups; a group composed of grade 1 to 3 and a group composed of grade 4 to 7 by a practical means, while the temperature related to tan $\delta$ of the specimens is classified into two groups, a group temperature related to tan $\delta$ at peak C. from 130 to 138, and a group temperature related to tan $\delta$ at peak C. from 139 to 159, and the number of specimens belonging to the above-mentioned classified groups were counted to prepare Table 3A. Polyolefin film having a splittability grade of 1, 2, 3, cannot be satisfactorily used for the purpose of the present invention. This is the reason for the classification of the splittability of the film as shown in Table 3A.

The expected statistical values of Table 3A are shown in Table 3B, and $\chi_0^2$ was calculated from Tables 3A and 3B, that is $\chi_0^2 = 9.25$. While the value of $\chi^2$ (1, 0.01) $= 6.635$, where the degrees of freedom $n = 1$, the level of the significant test $= 0.01$ of $\chi^2$ distribution of the statistical mathematics. Therefore, $\chi^2$ (1, 0.01) $< \chi_0^2$. In other words, it was found statistically that the groups of the temperature of peak "C" of tan $\delta$ in Table 3A belong to significantly different groups of grades of splittability and the polyolefin films belonging to the group wherein the temperature of peak C. of tan $\delta$ is from 139 to 159° C. have remarkable splittability.

TABLE 3A

| Temperature of peak "C" of tan $\delta$ group of splittability | From 130 to 138 | From 139 to 159 | Total |
|---|---|---|---|
| From grade 1 to grade 3 | 4 | 1 | 5 |
| From grade 4 to grade 7 | 0 | 8 | 8 |
| Total | 4 | 9 | 13 |

TABLE 3B

| Temperature of peak "C" of tan $\delta$ group of splittability | From 130 to 138 | From 139 to 159 | Total |
|---|---|---|---|
| From grade 1 to grade 3 | 1.54 | 3.46 | 5 |
| From grade 4 to grade 7 | 2.46 | 5.54 | 8 |
| Total | 4 | 9 | 13 |

Table 4A shows the statistical analysis table of the splittability of the polyolefine specimens with $S_{40}/S_1$ of the specimens shown in Table 2. Table 4A was prepared in the same manner as Table 3A.

TABLE 4A

| $S_{40}/S_1$ group of splittability | From 0.2 to 0.9 | From 0.91 | Total |
|---|---|---|---|
| From grade 1 to grade 3 | 1 | 5 | 6 |
| From grade 4 to grade 7 | 7 | 0 | 7 |
| Total | 8 | 5 | 13 |

The statistically expected values of Table 4A are shown in Table 4B, and $\chi_0^2 = 9.52$, while the value of $\chi^2$ (1, 0.01) $= 6.635$, where degrees of freedom $n = 1$, level of the significant test $= 0.01$ of $\chi^2$ distribution of statistical mathematics. Therefore, $\chi^2(1, 0.01) \; \chi_0^2$. In other words, it was found statistically that the group of $S_{40}/S_1$ in Table 4A belongs to significantly different groups of grades of splittability and the polyolefine films belonging to the group of $S_{40}/S_1$ from 0.9 to 0.2 have remarkable splittability.

TABLE 4B

| $S_{40}/S_1$ group of splittability | From 0.2 to 0.9 | From 0.91 | Total |
|---|---|---|---|
| From grade 1 to grade 3 | 3.70 | 2.3 | 6 |
| From grade 4 to grade 7 | 4.3 | 2.70 | 7 |
| Total | 8 | 5 | 13 |

Consequently, the splittable polyolefin film can be selected easily by the temperature related to the visco-elasticity ($T_c$) and the value of $S_{40}/S_1$. Actually, the preferable temperature ($T_c$) related to the visco-elasticity, tan $\delta$ is in a range between 130° C. and the melting temperature of the polyolefin film, thus, the desired polyolefin film having a high splittable property can be produced by manufacturing the polyolefin film according to the method of this invention in order to obtain the preferable temperature ($T_c$) related to the visco-elasticity, tan $\delta$ and to satisfy the value of $S_{40}/S_1$ of the polyolefin film.

Further it must be noticed that the polyolefin films of Nos. 6 to 13 in Table 2 have useful and desirable tensile strength even after the splitting operation. By using the above-mentioned polyolefin film, very fine and uniform configuration of split films can be easily obtained at high manufacturing efficiency by applying conventional splitting methods.

The polyolefin of this invention as described above has sufficient splittability, but in order to obtain more durable properties, such as resistance to impact, abrasion resistance, fatigue resistance, and satisfactory uniform fineness of the fibrilled pieces of the film, further improvements have been required. We have also found that a particular composition of polyolefin film improves the above mentioned deficiencies of polyolefin film.

A polyolefin film has been discovered which has the excellent splittability characteristics of the polyolefin film obtained according to our invention as already described and in addition has other improved physical properties. According to another embodiment of this invention, polyolefin is composed of 70 to 99 weight percent of polypropylene, 1 to 30 percent by weight of at least one member selected from the group of polyethylene and paraffinic polymer, wherein the paraffinic polymer is an aliphatic hydrocarbon having 6 or less alkyl groups, preferably methyl groups, per 100 carbon atoms, the mean molecular weight of the polymer being in the range between 500 and 7,000.

The polyethylene used may be of any kind, and it may be made by low pressure process, middle pressure process, or high pressure process; its mean molecular weight should preferably be in the range of 12,000 to 120,000.

It has been found that the above-mentioned ratio of composition of the component polymers is suitable for improving the character of the polyolefin films; on the other hand, if the ratio of composition of any one of the component polymers exceeds this ratio, the splittability and the mechanical properties may be decreased, and if the ratio of the composition of any one of the component polymers is below this ratio, the desirable splittability and the desirable mechanical properties cannot be obtained. In order to obtain substantial improvements in abrasion resistance, it is preferable to use paraffinic polymer for the above-mentioned polyethylene polymer.

The term paraffinic polymer means a polymer from a natural source or from the polymerization of hydrocarbons obtained from a petroleum refining process, such as AC polyethylene 6, AC polyethylene 6A, AC polyethylene 617, AC polyethylene 615, and AC polyethylene 629 of Allied Chemical Inc., each of which is a relatively low molecular weight polyethylene averaging from about 1500 to 6000; Mobil crystal No. 220 of Mobil Oil Co., Neoparaethylene No. 60 and Neoparaethylene No. 50 of Nippon Color Kogyo Inc. Preferably, the paraffinic polymer is obtained from the polymerization of normal, i.e. straight chained hydrocarbons.

Polyolefin film having the above-mentioned composition and characteristic features has excellent splittability above a grade of 4.

The high degree of splittability and other characteristic features of the film, having the composition described above and prepared in accordance with this invention are illustrated in Examples 2, 3 and 4. Table 5 shows the results obtained in Example 2.

EXAMPLE 2

Polypropylene pellets of different intrinsic viscosities (measured in Tetralin at 135° C.) and isotacticity of 94% were mixed with polyethylene pellets from the high pressure polymerization process and middle pressure polymerization process.

The intrinsic viscosities $\eta$ of the polypropylene and the mixing ratio of the polypropylene with the polyethylene are shown in Table 5. The mean molecular weight of the polyethylene (test specimen Nos. 14–17, 21 and 22) made from high pressure polymerization process was 30,000. The mean molecular weight of the polyethylene (test specimen Nos. 18–20, 23 and 24) made from middle pressure polymerization process was 50,000. Further, 0.1 weight percentage of Monsanto Chemical Co.'s antioxidant Santonox was added to the above-mentioned mixed substance. The mixed substance was melted at a maximum temperature of 270° C. and plasticized by the screw extruder 1 and the melt polymer was extruded from the exrtuder 1 by the manufacturing process shown in FIG. 4. The extruder polymer was cooled in the cooling bath 3 and cut into a plurality of tapes having a predetermined width corresponding to 1,000 denier by means of the cutter 8 after passing through the guide roller 4, and rollers 5, 6 and 7. The tapes thus produced were drawn up to a drawing ratio represented by SR from 0.85 to 0.95 while passing through the heater box 9 heated by infrared heater element. The temperature in the heater box 9 was maintained at above 175° C. by controlling the temperature of the heater element in a range from 320° C. to 380° C. After the above-mentioned drawing operation, the tapes were provided with a second drawing in a range from 1.1 to 1.3 while passing through the heater 13 wherein heated air is circulating, and then the tapes were taken up. The characteristic features of the tapes are shown in Table 5.

In Table 5, ST represents the tensile strength of the twisted tape to which twist of 200 turns/meter was imparted and measured with Instron tester under a condition of test length of 5 cm., and pulling speed of 2 cm./min., RF represents a measure for resistance to fibrillization of the specimens measured by the following method; the test price of film is rubbed with an abrasion element such as a grinder so as to cause fibrillization of the specimens, and the number of rubbing when the specimen is broken is measured as a measure for resistance to fibrillization. In Table 5, test specimens Nos. 33, 34, 35 and 36 represent specimens for comparison, specimens Nos. 33 and 34 represent films composed of polypropylene, specimen No. 35 is a blend tape composed of polypropylene and polyethylene polymers which does not have good splittability specimen No. 36 represents a blend tape composed of polypropylene and polyethylene polymers characterized by a higher content of the latter.

As shown in Table 5, the tapes produced by the present invention had excellent splittable property of above class 5, and the split fibrous materials had excellent mechanical properties and uniform fineness.

It was also noticed that the films of the invention shown in Table 5 were practically split into very fine fibrous pieces by passing through a jet air nozzle of the conventional splitting apparatus with high production efficiency, wherein jet air from 0.002 Nm.$^3$ to 0.03 Nm.$^3$/hour denier was passing through.

Further to confirm the practical end use of the polyolefine films of the present invention, several types of sewing threads were produced by following methods, that is, split tapes of test specimen No. 16 were treated by the following emulsion type agents A and B.

The agents adhered to the tapes at a ratio of 35 percentage on weight of the tapes. Next, after drying the treated tapes, the primary twist of 190 turns/meter, the secondary twist of 200 turns/meter were imparted to the tapes, and then the twisted tapes were drawn at a drawing ratio of 13 percentage under the drawing temperature 160° C. It was noticed that the sewing threads thus produced had excellent practical properties such as low stretchable property, tensile strength of 6.5 or 7.2 g./d.

Agent A was composed of:

| | Parts |
|---|---|
| Methyl methacrylate | 10.0 |
| Dibutyl phthalate | 3.0 |
| Hydrogenated rosin glyceroester | 1.0 |
| Polyethylene | 2.0 |
| Paraffin | 1.0 |
| Benzene peroxide | 0.2 |
| Lauryl phosphate | 5.0 |
| Water | 77.8 |

Agent B was composed of:

| | Parts |
|---|---|
| Ethyl acrylate | 10.0 |
| Butyl methacrylate | 10.0 |
| Hydrogenated rosin | 5.0 |
| Paraffin | 2.0 |
| Stearic acid | 2.0 |
| Ammonia | 2.0 |
| Benzene peroxide | 0.4 |
| Water | 68.6 |

EXAMPLE 3

Paraffin (AC polyethylene) was added to the polymers in Example 2 and several tapes having different compositions were produced as shown in Table 5.

In Table 6, test specimens Nos. 44, 45, 46, and 47 represent specimens for comparison. As it is clearly shown in Table 6, the characteristic features of the split table tapes shown in Table 6 are superior to those shown in Table 5.

EXAMPLE 4

Paraffin (AC polyethylene) was added to the polymers in Example 2 and several tapes having different compositions were produced as shown in Table 7.

In Table 7, test specimens Nos. 53 and 54 represent specimens for comparison. As it is clearly shown in Table 7, the characteristic features of the tapes of the present invention are superior to those of the comparison specimens.

TABLE 5

| Test specimen Number | Polypropylene component, weight percent | Polyethylene component, weight percent | Intrinsic viscosity [η] | Thickness of tape, μ | Tensile strength $S_1$, g./d. | Temperature of peak of "C" tan δ, °C. | $S_{40}/S_1$ | Temperature in the first heater box, °C. | SR | Temperature in the second heater box, °C. | Drawing ratio of the second drawing | Splittability (grade) | ST, g./d. | RF (number of rubbing) | Uniformity of split piece |
|---|---|---|---|---|---|---|---|---|---|---|---|---|---|---|---|
| 14 | 92.5 | 7.5 | 0.92 | 998 | 5.1 | 161 | 9.29 | 190 | 0.85 | 190 | 1.1 | 6 | 5.8 | 250 | Good. |
| 15 | 92.5 | 7.5 | 0.92 | 990 | 5.6 | 152 | 0.51 | 180 | 0.85 | 190 | 1.2 | 6 | 5.6 | 250 | Do. |
| 16 | 95.8 | 4.2 | 1.20 | 32 | 6.4 | 149 | 0.31 | 175 | 0.95 | 180 | 1.1 | 7 | 6.2 | 220 | Do. |
| 17 | 95.8 | 4.2 | 1.20 | 34 | 7.1 | 164 | 0.48 | 180 | 0.95 | 180 | 1.1 | 7 | 6.8 | 230 | Do. |
| 18 | 96.8 | 5.4 | 0.96 | 6 | 7.6 | 142 | 0.48 | 180 | 0.85 | 180 | 1.3 | 7 | 7.2 | 260 | Do. |
| 19 | 9.46 | 10.1 | 0.96 | 6 | 6.3 | 152 | 0.61 | 175 | 0.90 | 175 | 1.1 | 5 | 5.6 | 260 | Do. |
| 20 | 80.9 | 10.1 | 0.92 | 1,020 | 5.9 | 148 | 0.53 | 175 | 0.95 | 180 | 1.3 | 7 | 5.0 | 280 | Do. |
| 21 | 89.9 | 10.1 | 1.09 | 10 | 7.8 | 152 | 0.77 | 175 | 0.95 | 180 | 1.1 | 7 | 7.1 | 250 | Do. |
| 22 | 87.5 | 12.5 | 1.80 | 7 | 5.9 | 148 | 0.45 | 180 | 0.85 | 185 | 1.3 | 6 | 6.4 | 300 | Do. |
| 23 | 87.5 | 12.5 | 1.80 | 80 | 5.9 | 142 | 0.77 | 185 | 0.95 | 180 | 1.2 | 6 | 6.0 | 250 | Do. |
| 24 | 86.5 | 13.5 | 1.72 | 980 | 8.1 | 150 | 0.42 | 180 | 0.85 | 190 | 1.2 | 5 | 7.8 | 280 | Do. |
| 25 | 85.0 | 15.0 | 2.02 | 7 | 7.0 | 166 | 0.60 | 180 | 0.90 | 175 | 1.3 | 7 | 7.2 | 300 | Do. |
| 26 | 83.0 | 17.0 | 1.96 | 45 | 7.4 | 155 | 0.55 | 180 | 0.90 | 190 | 1.2 | 7 | 6.0 | 300 | Do. |
| 27 | 81.5 | 18.5 | 2.12 | 120 | 5.8 | 150 | 0.59 | 190 | 0.90 | 175 | 1.3 | 6 | 6.5 | 320 | Do. |
| 28 | 81.0 | 19.0 | 2.20 | 880 | 6.4 | 159 | 0.69 | 175 | 0.90 | 180 | 1.3 | 6 | 5.8 | 300 | Do. |
| 29 | 79.0 | 21.0 | 2.35 | 9 | 5.9 | 153 | 0.63 | 190 | 0.90 | 175 | 1.3 | 6 | 6.2 | 320 | Do. |
| 30 | 77.0 | 23.0 | 2.60 | 30 | 6.5 | 142 | 0.70 | 175 | 0.90 | 185 | 1.2 | 5 | 5.2 | 300 | Do. |
| 31 | 77.0 | 23.0 | 2.81 | 120 | 5.6 | 150 | 0.39 | 180 | 0.85 | 185 | 1.2 | 7 | 5.7 | 340 | Do. |
| 32 | 76.0 | 24.0 | 2.81 | 1,160 | 5.7 | 170 | 0.66 | 190 | 0.90 | 190 | 1.1 | 6 | 5.6 | 300 | Do. |
| 33 | 76.0 | 24.0 | 3.02 | 1,080 | 5.3 | 178 | 0.84 | 175 | 0.85 | 180 | 1.2 | 5 | 6.1 | 96 | Poor. |
| 34 | 100.0 | 0 | 1.40 | 30 | 4.9 | 148 | 0.70 | 190 | 0.75 | | 1.2 | 3 | 6.1 | 115 | Very poor. |
| 35 | 76.0 | 24.0 | 2.81 | 30 | 4.8 | 130 | 0.85 | 130 | 0.75 | 150 | 1.2 | 3 | 4.9 | 220 | Do. |
| 36 | 60.0 | 40.0 | 1.14 | 40 | 4.6 | 140 | 0.63 | 140 | 0.85 | 140 | 1.2 | 3 | 4.9 | 240 | Do. |

TABLE 6

| Test Specimen Number | Polypropylene component, weight percent | Polyethylene component, weight percent | Normal hydrocarbon polymer component, weight percent | Intrinsic viscosity [η] | Thickness of tape, μ | Temperature of peak of tan δ, °C. | Tensile strength $S_1$, g./d. | $S_{40}/S_1$ | Temperature in the first heater box, °C. | SR | Temperature in the second heater box, °C. | Drawing ratio of the second drawing | Splittability (grade) | ST, g./d. | RF (number of rubbing) | Uniformity of split piece |
|---|---|---|---|---|---|---|---|---|---|---|---|---|---|---|---|---|
| 37 | 92.5 | 5.0 | 2.5 | 0.92 | 902 | 165 | 5.1 | 0.3 | 190 | 0.85 | 190 | 1.1 | 6 | 5.4 | 640 | Good. |
| 38 | 89.9 | 9.0 | 1.1 | 0.94 | 1,020 | 170 | 6.0 | 0.6 | 190 | 0.85 | 190 | 1.2 | 6 | 7.0 | 700 | Do. |
| 39 | 94.0 | 1.0 | 5.0 | 1.10 | 25 | 150 | 6.5 | 0.7 | 180 | 0.90 | 185 | 1.3 | 7 | 7.1 | 750 | Do. |
| 40 | 81.0 | 10.0 | 9.0 | 1.20 | 30 | 146 | 7.0 | 0.6 | 180 | 0.95 | 185 | 1.2 | 7 | 7.5 | 750 | Do. |
| 41 | 72.0 | 10.0 | 18.0 | 1.40 | 35 | 148 | 7.3 | 0.5 | 175 | 0.90 | 180 | 1.2 | 7 | 7.4 | 800 | Do. |
| 42 | 80.0 | 9.0 | 11.0 | 1.05 | 110 | 139 | 6.4 | 0.7 | 180 | 0.90 | 180 | 1.3 | 7 | 7.0 | 700 | Do. |
| 43 | 89.0 | 5.0 | 6.0 | 1.15 | 120 | 139 | 5.9 | 0.8 | 175 | 0.90 | 175 | 1.2 | 6 | 6.4 | 640 | Do. |
| 44 | 85.0 | 5.0 | 10.0 | 1.24 | 60 | 130 | 4.3 | 0.2 | 130 | 0.80 | | | 2 | 6.1 | 600 | Poor. |
| 45 | 80.0 | 7.0 | 13.0 | 1.24 | 60 | 135 | 5.1 | 1.0 | 170 | 0.85 | 170 | 1.1 | 2 | 6.0 | 550 | Do. |
| 46 | 80.0 | 6.0 | 14.0 | 1.11 | 60 | 140 | 4.1 | 0.7 | 160 | 0.90 | 160 | 1.1 | 3 | 5.4 | 480 | Do. |
| 47 | 60.0 | 16.0 | 24.0 | 1.11 | | | | | | | | | | 4.5 | 220 | Do. |

TABLE 7

| Test Specimen No. | Polypropylene component, weight percent | Normal hydrocarbon polymer component, weight percent | Intrinsic viscosity [η] | Thickness of tape, μ | Temperature of peak "C" of tan δ, °C. | Tensile strength St, g/d. | S90/St | Temperature in the first heater box, °C. | SR | Temperature in the second heater box, °C. | Drawing ratio of the second drawing | Splittability (grade) | ST in g/d. | RF (number of rubbing) | Uniformity of split piece |
|---|---|---|---|---|---|---|---|---|---|---|---|---|---|---|---|
| 48 | 98 | 2 | 1.10 | 25 | 140 | 6.2 | 0.4 | 180 | 0.85 | 180 | 1.3 | 7 | 6.4 | 300 | Good |
| 49 | 96 | 4 | 1.30 | 50 | 142 | 6.6 | 0.6 | 185 | 0.85 | 190 | 1.3 | 7 | 6.2 | 280 | Do. |
| 50 | 92 | 8 | 1.05 | 100 | 150 | 6.9 | 0.7 | 190 | 0.85 | 190 | 1.2 | 7 | 6.5 | 420 | Do. |
| 51 | 85 | 15 | 1.80 | 500 | 160 | 5.7 | 0.6 | 190 | 0.85 | 190 | 1.1 | 6 | 6.3 | 400 | Do. |
| 52 | 72 | 28 | 1.60 | 700 | 180 | 6.4 | 0.7 | 190 | 0.90 | 190 | 1.1 | 5 | 6.7 | 380 | Do. |
| 53 | 65 | 35 | 1.40 | 80 | 150 | 4.3 | 0.6 | 160 | 0.90 | 170 | 1.2 | 2 | 5.0 | 300 | Poor |
| 54 | 60 | 40 | 1.30 | 30 | 120 | 5.1 | 0.9 | 130 | 0.90 | — | — | 2 | 5.5 | 380 | Do. |
| 55 | 90 | 10 | 1.20 | 900 | 140 | 6.0 | 0.8 | 190 | 0.85 | 190 | 1.2 | 6 | 6.3 | 390 | Good |

Generally, polyolefin film or yarns lacks dyeability, thereby the utilization of the polyolefin products have been restricted to a small market. Even if polyolefin having excellent splittability for manufacturing practical textile yarn can be obtained by the above-mentioned embodiments of the invention, the drawback of poor dyeability of the polyropylene film also restricts their use.

Therefore, improvement of dyeability of the splittable polyolefin films of the invention is one of the key features for improving marketability of yarn directly produced from polyolefin.

According to a further embodiment of this invention, pololefin films having excellent splittability and also dyeability have been discovered.

One of the improved polyolefin films of this invention which has a high grade of splittability and which has excellent characteristics with respect to dyeing is composed of two compounds, polypropylene and a copolymer composed of 10 to 60 weight percent of alkyl acrylate or alkyl methacrylate wherein the alkyl group has 16 to 20 carbon atoms, 80 to 30 percent by weight of vinylpyridine and 10 to 60 percent by weight of an acrylate or methacrylate polymer having a second order transition temperature below 0° C. The alkyl acrylate or alkyl methacrylate constituent of the copolymer wherein the alkyl group has 16 to 20 carbon atoms may be, for example, cetyl acrylate, stearyl acrylate, eicosyl acrylate, cetyl methacrylate, stearyl methacrylate, eicosyl methacrylate, and etc. 2-vinylpyridine, 3-vinylpyridine, 4-vinylpyridine, 2-methyl-5-vinylpyridine, 4-methyl-5-vinylpyridine, 5-ethyl-2-vinylpyridine, 2-isopropenylpyridine, 3-isopropenylpyridine, 4-isopropenylpyridine, and etc. exemplify the compounds used as the vinylpyridine constituent of the copolymer. Acrylate and methacrylate polymers having a second order transition temperature below 0° C. which are part of the copolymer used for the present splittable and dyeable films include for example polymers obtained from the following; ethyl acrylate, propyl acrylate, butyl acrylate, hexyl acrylate, octyl acrylate, lauryl acrylate, 2-ethylhexyl acrylate, hexyl methacrylate, octyl, methacrylate, lauryl methacrylate, tetradecyl methacrylate, etc. The copolymer composed of the three components is preferably added to the polyolefin in a ratio of from 0.5–20, preferably from 1 to 10 percent by weight. Additional substances such as a promotor for improving the dyeability of the polyolefin film, an ultraviolet ray absorbing agent, a peroxide resolving agent, antioxidant, organic zinc compound or other metallic salt of higher fatty acid, titanium oxide, pigment, an optical bleaching agent, an antistatic agent and low molecular polyethylene can be added without changing the characteristic features of the film of the present invention.

As the promotor for improving the dyeability of the polyolefin film of the invention, polyoxyethylenealkylamine, polyoxyethylenealkyl ether, polyoxyethylenealkylphenol ether, polyoxyethylene alkylester, sorbitanalkylester, polyoxyethylenesorbitan alkylester, polyoxyethylene, polyoxypropylene, polyoxyisobutylene, copolymer of ethylene oxide with propylene oxide, etc. can be used.

UV 531 of Allied Chemical Co., DOBP of Eastman Kodak Co., 2-hydroxy-4-octadecyloxybenzophenone, and He-327 of Geigy Co. are among the preferable ultraviolet ray absorbing agents used with the present films. As the peroxide resolving agent, octadecyl phosphite, diphenylpentaerythritol diphosphite, trilauryl trithiophosphite, etc. can be used for the present invention, Irganox/1010, Irganox/858, Irganox/1076, Irganox/565 of Geigy Co., Ionox/330 of Shell Co., Topanol/CA of I.C.I., Santonox of Monsanto Chemical Co., etc. are examples of the antioxidant used for the present invention. Calcium stearate and zinc stearate are examples of the organic zinc compound, or other metallic salt of a higher fatty acid which may be used according to the invention.

The above-mentioned materials for making the compounds of the invention are mixed by means of a powder mixing or master batch system. The polyolefin film of the invention can be produced simply by extruding the above-mentioned compound by an extruder as illustrated in Examples 1 and 2. It must also satisfy the conditions characterized by the temperature relating to tan δ and the value of $S_{40}/S_1$ in Examples 1 and 2 to obtain films having excellent splittability.

EXAMPLE 5

Polymers of 25 parts by weight of stearyl methacrylate, 60 parts by weight of 2-methyl-5-vinylpyridine, 15 parts by weight of ethyl acrylate and 1 part by weight of azo-bisbutyronitrile were mixed together with 300 parts by weight of benzene and polymerized in nitrogen gas at 75° C. for 8 hours, after completion of the polymerization, the content of the reactor was poured into a large quantity of petroleum ether so as to settle the copolymer in the petroleum ether, and the petroleum ether containing the product of the reactor was filtered and the copolymer dried under reduced pressure. Thus 72 parts by weight of the copolymer was produced. It was found that the content of 2-methyl-5-vinylpyridine in the copolymer was 61 percent by weight by nitrogen analysis.

A mixture of polypropylene polymer with the above-mentioned copolymer to which has been added as a stabilizer, a mixture of 0.3 part of 4,4'-thiobis-6-t-butyl-3-methylphenol and 0.05 part of dilauryl thiodiproprionate per 100 parts of polymer was treated at 220° C. to produce pellets. The mixing ratios of the above-mentioned pellets are shown in Table 8. The pellets thus prepared were supplied to the extruder 1 shown in FIG. 4 and polypropylene tapes were produced in the same manner as shown in Examples 1 and 2.

The dyeability of the films were tested as follows: Solway Blue B-150 (C.I. Acid Blue 45) was used; the concentration of $H_2SO_4$ was 2 g./l., mass ratio of the specimen to the dye liquor was 1:50; and temperature of dye liquor was maintained at 98° C. After dyeing for 90 minutes, the specimen was soaped with a conventional soaping liquor at 70° C. for 20 min. The concentration of the dyestuff was 5% O.W.F. (on the weight of fiber-like piece).

TABLE 8

| Item | Test specimen No. | | | | |
|---|---|---|---|---|---|
| | 56 | 57 | 58 | 59 | 60 |
| Polypropylene component, weight percent | 83 | 93 | 93 | 93 | 100 |
| Copolymer, weight percent | 15 | 5 | 5 | 5 | 0 |
| Intrinsic viscosity μ | 1.30 | 1.30 | 1.30 | 1.30 | 1.30 |
| Thickness of tape, μ | 69 | 66 | 68 | 66 | 65 |
| Temperature of peak "C" of tan δ | 145 | 148 | 132 | 145 | 145 |
| Tensile strength $S_1$, g./d | 5.9 | 6.3 | 6.5 | 6.3 | 6.5 |
| $S_{40}/S_1$ | 0.75 | 0.82 | 0.92 | 0.95 | 0.82 |
| Temperature in the first drawing, ° C | 175 | 175 | 175 | 175 | 175 |
| SR | 0.85 | 0.85 | 0.80 | 0.85 | 0.85 |
| Temperature in the second drawing, ° C | 180 | 180 | 170 | 180 | 180 |
| Drawing ratio of the second drawing | 1.2 | 1.2 | 1.2 | 1.2 | 1.2 |
| Splittability (grade) | 7 | 7 | 2 | 3 | 5 |
| ST, g./d | 5.6 | 6.0 | 6.0 | 5.9 | 6.0 |
| Uniformity of split pieces | Good | Good | Normal | Poor | Normal |
| Dye exhaustion, percent | 99 | 89 | 82 | 83 | 0 |

In Table 8, the specimens represented by Nos. 58, 59 and 60 were comparison materials. As shown in Table 8, the polypropylene film of the present invention have excellent splittability, being above grade 4 and sufficient tensile strength and dyeability for practical use. Further, the films thus produced were found to have excellent splittable property by the compressed air method, wherein the films were carried through a jet air nozzle while compressed air is passed through the nozzle at a ratio of 0.002–0.03 Nm.³/hour denier.

Another improved polyolefin film having excellent dyeability and splittable properties is composed of polypropylene and a metallic salt of a higher fatty acid designated by the general formula: $(RCOO)_nM(OR')_m$ wherein R represents an alkyl radical of $C_{11}$ to $C_{21}$, R' represents H or an alkyl radical of $C_1$ to $C_8$, $n=1$, 2 or 3 and $m=0$, 1 or 2, further $n+m=2$ or 3, and M represents Ni, Zn or Al. Examples of such higher fatty acid metallic salts, include Preferably, the content of the metallic salt of a higher fatty acid in the polyolefin film is from 0.1 to 5 percent by weight with respect to the content of the polyolefin.

EXAMPLE 6

An additional agent represented by $(C_{17}H_{33}COO)_2Ni$ was mixed with polypropylene polymer in the mixing ratios shown in Table 9, and the mixed material composed of polypropylene polymer $(C_{17}H_{33}COO)_2Ni$ and a stabilizer composed of a mixture of 0.3 part of 4,4'-thiobis-6-t-butyl-3-methylphenol and 0.05 part of dilauryl thiodipropionate per 100 parts of polymer was treated at 220° C. so as to produce pellets. The pellets were supplied to the extruder 1 shown in FIG. 4 and polyolefin tapes were produced in the same manner as shown in Examples 1 and 2. The characteristic features of the tapes are also shown in Table 9. The dyeability of the tapes were tested by the following dyeing operation: the tapes were dyed with a dye liquor composed of 5% O.W.F. of National polypropylene scarlet RBM, 5% O.W.F. of Kayanox PD (sodium alkyl benzene sulfonate) and 0.2 g./l. of acetic acid at 100° C. for 90 min.; after the dyeing operation, the dyed specimens were soaped in a soaping liquor composed of 0.5 g./l. of Scoarole No. 400 (polyoxyethylene nonyl phenyl ether) and 0.5 g./l. of soda ash at 70° C. for 20 minutes; and the liquor ratio was 1:50.

TABLE 9

| Item | Test specimen No. | | | | |
|---|---|---|---|---|---|
| | 61 | 62 | 63 | 64 | 65 |
| Polypropylene component, weight percent | 93 | 96 | 96 | 96 | 99 |
| Copolymer, weight percent | 4.5 | 2 | 0.2 | 2 | 0 |
| Intrinsic viscosity, η | 1.4 | 1.4 | 1.4 | 1.4 | 1.4 |
| Thickness of tape, μ | 36 | 36 | 38 | 35 | 35 |
| Temperature of peak "C" of tan δ | 146 | 148 | 150 | 146 | 145 |
| Tensile strength $S_1$, g./d | 5.9 | 6.1 | 6.0 | 6.1 | 6.5 |
| $S_{40}/S_1$ | 0.75 | 0.75 | 0.65 | 0.95 | 0.82 |
| Temperature in the first drawing | 175 | 175 | 175 | 175 | 175 |
| SR | 0.85 | 0.85 | 0.85 | 0.85 | 0.85 |
| Temperature in the second drawing, ° C | 180 | 180 | 180 | 180 | 180 |
| Drawing ratio of the second drawing | 1.2 | 1.2 | 1.2 | 1.2 | 1.2 |
| Splittability (grade) | 7 | 7 | 7 | 3 | 5 |
| ST, g./d | 5.7 | 5.7 | 5.7 | 5.7 | 5.7 |
| Uniformity of split pieces | Good | Good | Good | Normal | Normal |
| Dye exhaustion, percent | 98 | 94 | 30 | 8.9 | 10 |
| Color | (¹) | (¹) | (²) | (¹) | (³) |

¹ Dark red.  ² Pale orange.  ³ Pale yellowish green.

In Table 9, specimens represented by Nos. 64 and 65 were tested for comparison. As it is clear in Table 9, the polypropylene tapes of the invention have excellent dyeability and splittable properties.

EXAMPLE 7

The following additional agents were mixed with polypropylene polymer at the mixing ratios shown in Table 10 and polypropylene tapes were made from the above-mentioned mixture in the same manner as that of Example 6. The additional agents were (1) $(C_{21}H_{43}COO)_2Zn$, (2) $(C_{11}H_{23}COO)_2Ni$, (3) $(C_{17}H_{35}COO)_2Al(OC_3H_7)$, (4) $(C_{17}H_{35}COO)_2Ni(OC_3H_7)$. The characteristic features of the tapes were measured and are shown in Table 10.

The tests on dyeability of specimens Nos. 67 and 69 were performed in the same manner as that of Example 6 but the tests of specimens Nos. 66 and 68 were performed as follows.

The specimen No. 66 was dyed with a dye liquor comprising 5% O.W.F. of Diaporon Red RS, 5% O.W.F. of Nonipol 160 (polyoxyethylene alkylphenyl ether) and 0.2 g./l. of acetic acid, while the specimen No. 68 was dyed with a dye liquor comprising 5% O.W.F. of Proset Ted AB, 5% O.W.F. of Nonipol 160 and 0.2 g./l. of acetic acid. After dyeing, both specimens were soaped under the same condition as that of Example 6.

TABLE 10

| Item | Test specimen No. | | | |
|---|---|---|---|---|
| | 66 | 67 | 68 | 69 |
| Copolymer, weight percent | 4.5 | 4.5 | 4.5 | 4.5 |
| Intrinsic viscosity, $\eta$ | 1.3 | 1.3 | 1.3 | 1.3 |
| Thickness of tape, $\mu$ | 36 | 35 | 38 | 34 |
| Temperature of peak "C" of tan $\delta$ | 148 | 146 | 150 | 148 |
| Tensile strength $S_1$, g./d | 5.7 | 5.6 | 6.0 | 5.9 |
| $S_{40}/S_1$ | 0.70 | 0.75 | 0.60 | 0.65 |
| Temperature in the first drawing, °C | 180 | 180 | 180 | 180 |
| SR | 0.85 | 0.85 | 0.85 | 0.85 |
| Temperature in the second drawing, °C | 185 | 185 | 185 | 185 |
| Drawing ratio of the second drawing | 1.25 | 1.25 | 1.25 | 1.25 |
| Splittability (grade) | 7 | 7 | 7 | 7 |
| ST | 5.2 | 5.2 | 5.6 | 6.0 |
| Uniformity of split pieces | Good | Good | Normal | Good |
| Dye exhaustion, percent | 99 | 98 | 96 | 98 |
| Color | (1) | (2) | (3) | (2) |

[1] Dark red (clear). [2] Dark red. [3] Dark bluish red.

The polypropylene tapes of the invention had excellent dyeability and splittability as shown in Table 10. Further, it was found that the films shown in Table 10 were split into very fine fibrous pieces by passing through a jet air nozzle of the conventional splitting apparatus, wherein jet air was passed at a rate of 0.005 Nm.³/hour denier.

Generally, synthetic fibrous materials have a characteristic defect caused by static electricity. The products of the polypropylene films of the invention have this defect also. It has been found possible, according to another aspect of this invention to eliminate the problem of static electricity. Polypropylene films having improved antistatic properties as well as excellent splittability and dyeability according to this invention are composed of polypropylene polymers and at least one compound which is a salt of an amino carboxylic acid selected from compounds having the formula R is alkyl, cycloalkyl or alkylcycloalkyl group of 8–22 carbon atoms, R' is H or $CH_3$, M is nickel, zinc or aluminum, $n$ is an integral number corresponding to the valence of M, $m$ is 1, 2 or 3 and $x$ and $y$ are integral numbers dependent on the valence of M each being 1 when the valence of M is 2, $x=3$ and $y=2$ when the valence of M is 3. Examples of such salts of amino carboxylic acids include and The quantity of the additional polymer to be added is preferably from 0.1 to 5 percent by weight with respect to the quantity of polypropylene polymer. It must be noted that the characteristic features of the polypropylene film relating to visco-elasticity and $S_{40}/S_1$, required in Examples 1 and 2 are also required for the present embodiment of the invention in order to obtain excellent splittability.

The following examples show the components and characteristic features of the polypropylene films of the present embodiment.

EXAMPLE 8

An additional polymer of [$H_{37}C_{18}NHCH_2CH_2COO$]$_2$Ni was mixed with the polypropylene polymer according to the mixing conditions shown in Table 11. Further, the stabilizer used in Examples 5 and 6 was added to the above-mentioned mixture and pellets were produced by melting the mixture of polypropylene polymer and additional polymer with the stabilizer. The pellets were supplied to the extruder I shown in FIG. 4 and improved polypropylene films were produced in the same manner as illustrated in Example 1. The dyeability test was performed as follows: The specimens were dyed with a dye liquor comprising 5% O.W.F. of National Polypropylene Scarlet RBM and 5% O.W.F. of Kayanox PD and 0.2 g./l. of acetic acid at a liquor ratio of 1:50, for 90 min. at 100° C., and after the dyeing operation, the specimens were soaped in a soaping liquor comprising 0.5 g./l. of Scourol No. 400 and 0.5 g./l. of sodium carbonate at a liquor ratio of 1:50, for 20 min. at 70° C. The effect of the antistatic agent was measured by the following method; after the specimen was charged with static electricity of 10,000 volts, the half-value period (in seconds) of the static electricity charged on the specimen was measured in an atmosphere of 20° C. and 50% RH by using an instrument for measuring the effect of antistatic agent. Generally, it is well-known that in case of half-value period below 60 seconds, there is no problem caused by static electricity.

TABLE 11

| Item | Test Specimen No. | | | | |
|---|---|---|---|---|---|
| | 70 | 71 | 72 | 73 | 74 |
| Polypropylene component, percent | 93 | 96 | 96 | 96 | 99 |
| Additional polymer component, percent | 4.5 | 2 | 2 | 2 | 0 |
| Intrinsic viscosity, $\eta$ | 1.4 | 1.4 | 1.4 | 1.4 | 1.4 |
| Thickness of tape, $\mu$ | 34 | 33 | 37 | 35 | 35 |
| Temperature of peak "C" of tan $\delta$ | 146 | 148 | 132 | 146 | 132 |
| Tensile strength $S_1$, g./d | 5.9 | 6.1 | 6.0 | 6.1 | 6.5 |
| $S_{40}/S_1$ | 0.75 | 0.75 | 0.82 | 0.95 | 0.95 |
| Temperature in the first drawing, °C | 175 | 175 | 165 | 175 | 175 |
| SR | 0.85 | 0.85 | 0.80 | 0.85 | 0.85 |
| Temperature in the second drawing, °C | 180 | 180 | 170 | 180 | 180 |
| Drawing ratio of the second drawing | 1.2 | 1.2 | 1.2 | 1.2 | 1.2 |
| Splittability of tape (grade) | 7 | 7 | 3 | 3 | 5 |
| ST, g./d | 5.2 | 5.7 | 5.7 | 5.7 | 5.9 |
| Uniformity of split pieces | Good | Good | Normal | Normal | Normal |
| Dye exhaustion, percent | 98 | 90 | 90 | 89 | 0 |
| Antistatic property, seconds | 10 | 25 | 25 | 25 | >500 |

In Table 11, the specimens of Nos. 72, 73 and 74 were given for comparison with the polypropylene tapes of the present embodiment. As it is clearly shown in Table 11, the polypropylene tapes of the present embodiment have excellent splittable property, mechanical property, dyeability and antistatic property.

EXAMPLE 9

A mixed additional polymer composed of and was mixed with the polypropylene polymer according to the mixing conditions shown in Table 12. The polypropylene tapes were produced in the same manner as that of Example 1 from the above-mentioned mixed polymers. The characteristic features of the polypropylene tapes thus obtained are shown in Table 12. The dyeing of the specimens of Nos. 75, 77 was carried out with a dye liquor comprising 5% O.W.F. of Diaporon Red RS, 5% O.W.F. of Nonipol 160 (polyoxyethylene alkyl phenyl ether) and 0.2 g./l. of acetic acid while dyeing the specimens of Nos. 76, 78 was carried out with a dye liquor comprising 5% O.W.F. of Proset Red AB, 5% O.W.F. of Nonipol 160, and 0.2 g./l. of formic acid. The other conditions of the dyeability test were the same as those of Example 8. The polypropylene tapes thus obtained have excellent splittable property, mechanical and antistatic properties, and dyeability as shown in Table 12.

TABLE 12

| Item | Test Specimen No. | | | |
|---|---|---|---|---|
| | 75 | 76 | 77 | 78 |
| Additional polymer, component, percent | 4.5 | 4.5 | 4.5 | 4.5 |
| Intrinsic viscosity, $\mu$ | 1.3 | 1.3 | 1.3 | 1.3 |
| Thickness of tape, $\mu$ | 36 | 35 | 38 | 34 |
| Temperature of peak "C" of tan $\delta$ ° C | 146 | 149 | 149 | 150 |
| Tensile strength $S_1$, g./d | 6.1 | 6.3 | 5.9 | 6.5 |
| $S_{40}/S_1$ | 0.75 | 0.70 | 0.65 | 0.60 |
| Temperature in the first drawing, ° C | 180 | 180 | 180 | 180 |
| SR | 0.85 | 0.85 | 0.85 | 0.85 |
| Temperature in the second drawing | 1.25 | 1.25 | 1.25 | 1.25 |
| Splittability (grade) | 7 | 7 | 7 | 7 |
| ST, g./d | 5.7 | 5.7 | 5.8 | 6.0 |
| Uniformity of split pieces | Good | Good | Normal | Normal |
| Dye exhaustion, percent | 98 | 97 | 98 | 98 |
| Antistatic property in seconds | 3.0 | 2.5 | 1.5 | 3.5 |

While the invention has been described in conjunction with certain embodiments thereof, it is to be understood that various modifications and changes may be made without departing from the spirit and scope of the invention.

What we claim and desire to secure by Letters Patent is:

1. An improved splittable polyolefin film consisting of polypropylene having a thickness from 5 to 1200$\mu$, a characteristic temperature ($T_c$) relating to the visco-elasticity of said polyolefin film in the range of 138° C. to the melting point of said polyolefin film, wherein said temperature ($T_c$) is the temperature of the maximum peak of the curve obtained by plotting the visco-elasticity of said polyolefin film against temperatures at which said visco-elasticity is measured and also having a length dependence of strength value, $S_{40}/S_1$ in the range of 0.2 to 0.9, wherein $S_1$ and $S_{40}$ are the values of tensile strength of said polyolefin film when the length thereof is 1 cm. and 40 cm., respectively, the pulling speed during the measurement of said tensile strength being 50% elongation per minute and comprising the product obtained by subjecting a polyolefin film to a two-stage drawing operation wherein said polyolefin film is drawn in the first stage at a ratio of 0.81 to 0.95 of the maximum draw ratio at a temperature of at least 175° C. and in the second stage at a draw ratio of 1.1 to 1.3 at a temperature of at least 175° C.

References Cited

UNITED STATES PATENTS 3,402,548     9/1968     Wininger et al. _________ 57—140

JOSEPH L. SCHOFER, Primary Examiner

A. HOLLER, Assistant Examiner

U.S. Cl. X.R.

260—94.9 GD; 264—210 F, 288